United States Patent
Kikuchi et al.

(10) Patent No.: US 6,791,955 B1
(45) Date of Patent: Sep. 14, 2004

(54) SYSTEM, TRANSMITTER AND RECEIVER FOR CODE DIVISION MULTIPLEX TRANSMISSION

(75) Inventors: Hideo Kikuchi, Kawaguchi (JP); Mutsumu Serizawa, Tokyo (JP); Tokihiko Yokoi, Yokohama (JP); Eiichi Watanabe, Kawasaki (JP); Shuji Hirakawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 906 days.

(21) Appl. No.: 09/663,202

(22) Filed: Sep. 18, 2000

(30) Foreign Application Priority Data

Nov. 29, 1999 (JP) .......................................... 11-337403

(51) Int. Cl.[7] .............................................. H04B 7/216
(52) U.S. Cl. ........................ 370/320; 370/335; 370/342; 370/441
(58) Field of Search ................................ 370/320, 321, 370/335, 342, 441, 337, 345, 442, 328, 509; 375/140–147, 149, 354, 355, 356; 455/502

(56) References Cited

U.S. PATENT DOCUMENTS

| | | | |
|---|---|---|---|
| 5,260,967 A | | 11/1993 | Schilling |
| 5,673,260 A | * | 9/1997 | Umeda et al. .............. 370/342 |
| 5,930,366 A | | 7/1999 | Jamal et al. |
| 6,144,650 A | * | 11/2000 | Watanabe et al. ........... 370/335 |
| 6,208,632 B1 | * | 3/2001 | Kowalski et al. ........... 370/335 |
| 6,226,315 B1 | * | 5/2001 | Sriram et al. ............... 375/140 |

OTHER PUBLICATIONS

Dahlman et al, WCDMA–The Radio Interface for Future Mobile Multimedia Communications, IEEE, pp. 1105–1118, 1998.*

Dennett, The cdma2000 ITU–R RTT Candidate Submission (0.18), pp. 1–311, 1998.*

Proposal to ITU for G3 RTT, TD–SCDMA Radio Transmission Technology For IMT–2000, Draft V.0.4, pp. 1–46, 1998.*

* cited by examiner

*Primary Examiner*—Frank Duong
(74) *Attorney, Agent, or Firm*—Oblon, Spivak, McClelland, Maier & Neustadt, P.C.

(57) ABSTRACT

The code division multiplex transmission system according to the present invention produces data for transmission by, time-division multiplexing the signals for synchronizing spread code prepared for an easy synchronization of spread code on the receiving side and the information related to the structure or synchronization of each of a plurality of transmission data streams such as parameters information about the coding rate of the convolution code and interleaving size for each transmission data stream, generating spread frequency modulated signals of the above time-division multiplexed signals by a spread frequency modulation using a spread code known to the receiving side, and code-division multiplexing the resulting spread frequency modulated signals over the spread frequency modulated signals of the plurality of transmission data streams. As a result, the receiving terminal can obtain information such as parameters information of all the transmission data streams, as long as the receiving terminal receives the synchronization signal. Therefore, even if the receiving terminal does not understand the parameter values required for the reception of each transmission data stream, the receiving terminal can receive any transmission data stream easily and quickly, by setting the parameter values for each receiving process based on the parameters information about each transmission data stream obtained by the reception of the synchronization signal.

40 Claims, 8 Drawing Sheets

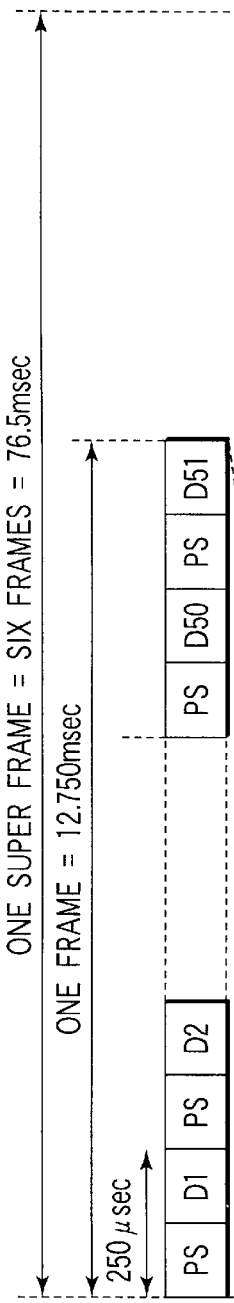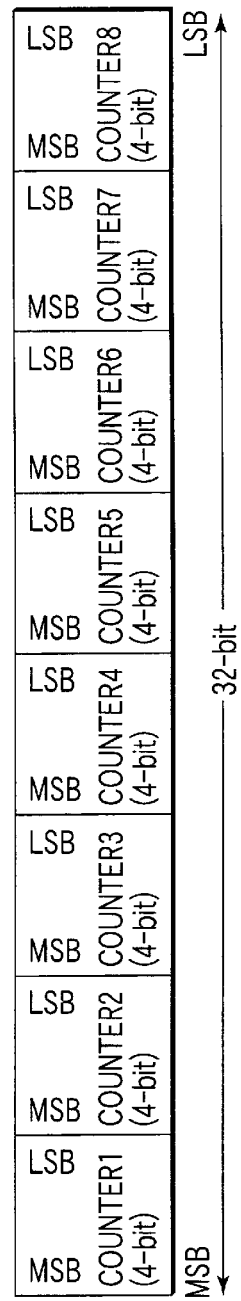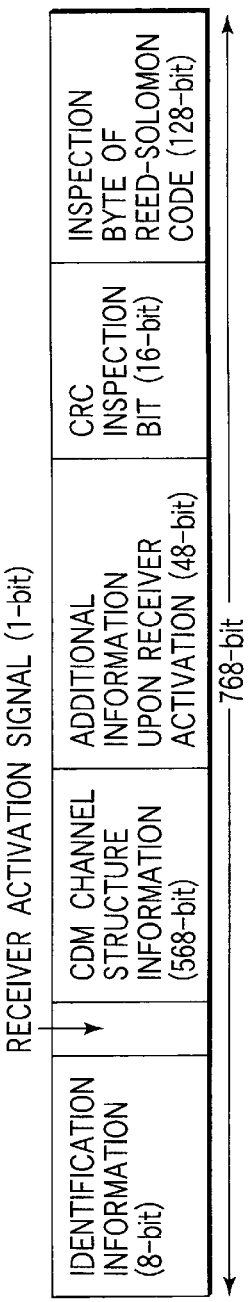

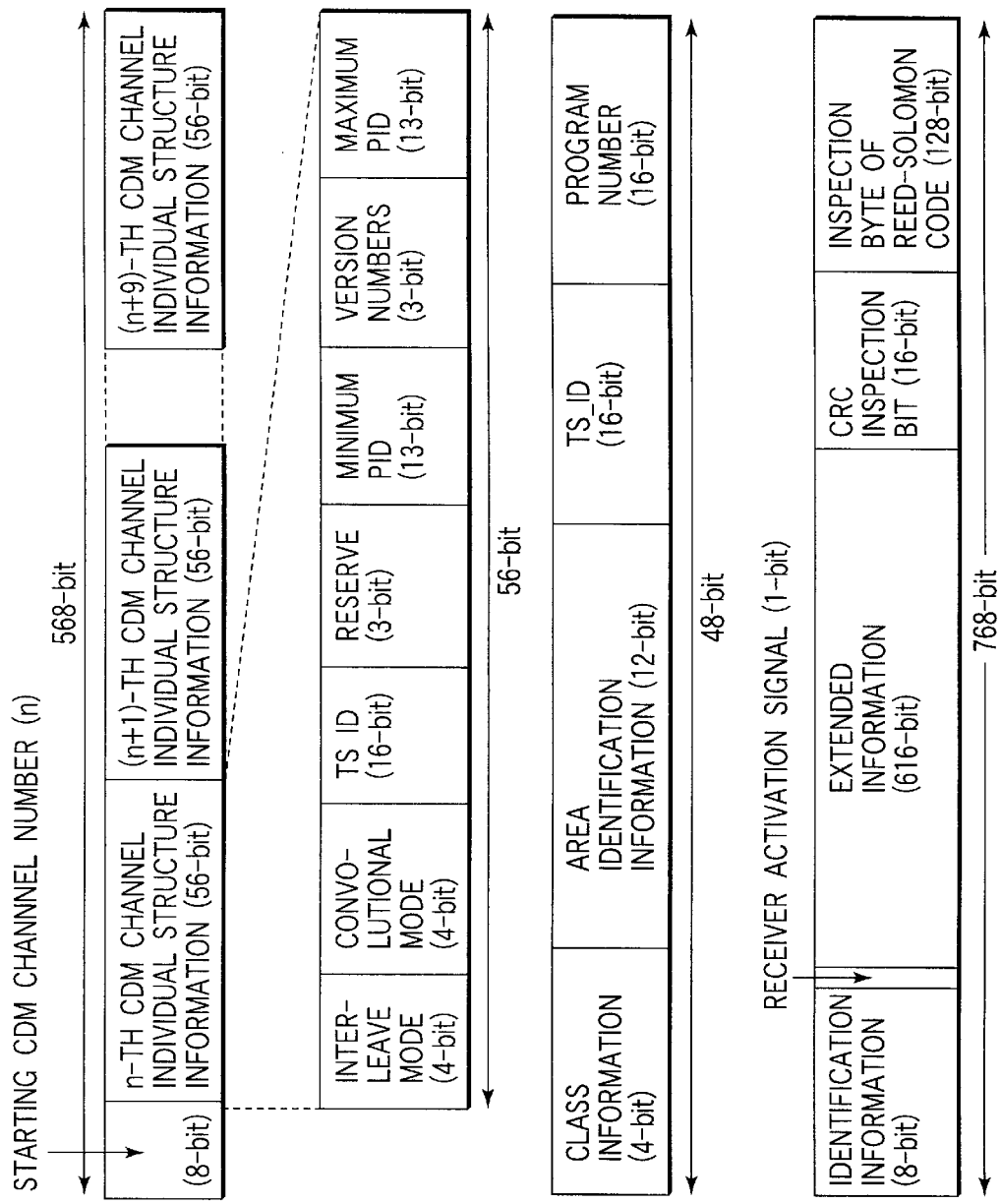
F I G. 4
F I G. 5
F I G. 6

| IDENTIFICATION INFORMATION | ※ | CDM CHANNEL STRUCTURE INFORMATION (#1~#10) | ADDITIONAL INFORMATION UPON RECEIVER ACTIVATION | CRC INSPECTION BIT | INSPECTION BYTE OF REED-SOLOMON CODE |
|---|---|---|---|---|---|
| IDENTIFICATION INFORMATION | ※ | CDM CHANNEL STRUCTURE INFORMATION (#11~#20) | ADDITIONAL INFORMATION UPON RECEIVER ACTIVATION | CRC INSPECTION BIT | INSPECTION BYTE OF REED-SOLOMON CODE |
| IDENTIFICATION INFORMATION | ※ | CDM CHANNEL STRUCTURE INFORMATION (#21~#30) | ADDITIONAL INFORMATION UPON RECEIVER ACTIVATION | CRC INSPECTION BIT | INSPECTION BYTE OF REED-SOLOMON CODE |
| IDENTIFICATION INFORMATION | ※ | CDM CHANNEL STRUCTURE INFORMATION (#31~#40) | ADDITIONAL INFORMATION UPON RECEIVER ACTIVATION | CRC INSPECTION BIT | INSPECTION BYTE OF REED-SOLOMON CODE |
| IDENTIFICATION INFORMATION | ※ | CDM CHANNEL STRUCTURE INFORMATION (#41~#50) | ADDITIONAL INFORMATION UPON RECEIVER ACTIVATION | CRC INSPECTION BIT | INSPECTION BYTE OF REED-SOLOMON CODE |
| IDENTIFICATION INFORMATION | ※ | CDM CHANNEL STRUCTURE INFORMATION (#51~#60) | ADDITIONAL INFORMATION UPON RECEIVER ACTIVATION | CRC INSPECTION BIT | INSPECTION BYTE OF REED-SOLOMON CODE |
| IDENTIFICATION INFORMATION | ※ | CDM CHANNEL STRUCTURE INFORMATION (#61~#70) | ADDITIONAL INFORMATION UPON RECEIVER ACTIVATION | CRC INSPECTION BIT | INSPECTION BYTE OF REED-SOLOMON CODE |
| IDENTIFICATION INFORMATION | ※ | EXTENDED INFORMATION | | CRC INSPECTION BIT | INSPECTION BYTE OF REED-SOLOMON CODE |
| IDENTIFICATION INFORMATION | ※ | EXTENDED INFORMATION | | CRC INSPECTION BIT | INSPECTION BYTE OF REED-SOLOMON CODE |
| IDENTIFICATION INFORMATION | ※ | EXTENDED INFORMATION | | CRC INSPECTION BIT | INSPECTION BYTE OF REED-SOLOMON CODE |
| IDENTIFICATION INFORMATION | ※ | EXTENDED INFORMATION | | CRC INSPECTION BIT | INSPECTION BYTE OF REED-SOLOMON CODE |
| IDENTIFICATION INFORMATION | ※ | EXTENDED INFORMATION | | CRC INSPECTION BIT | INSPECTION BYTE OF REED-SOLOMON CODE |

FIG. 7

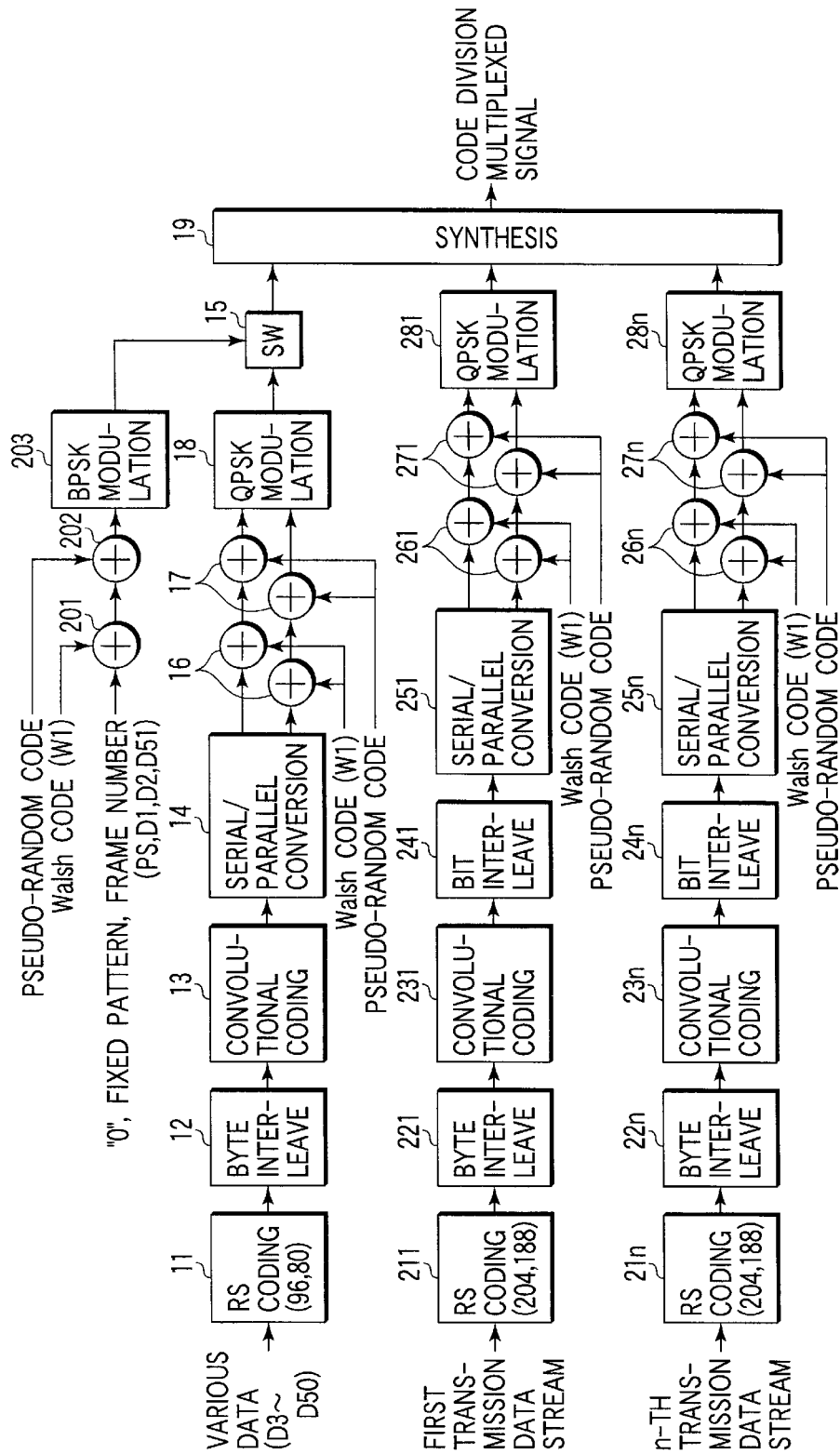
F I G. 9

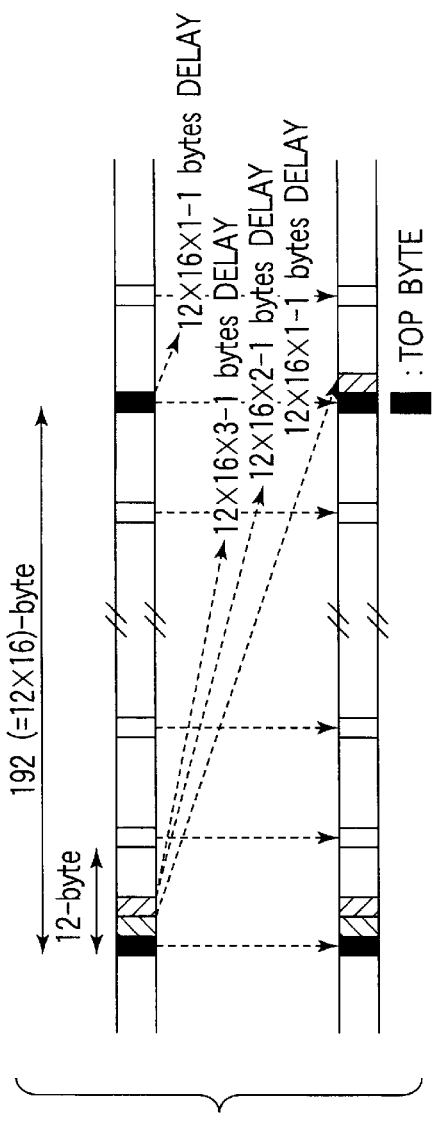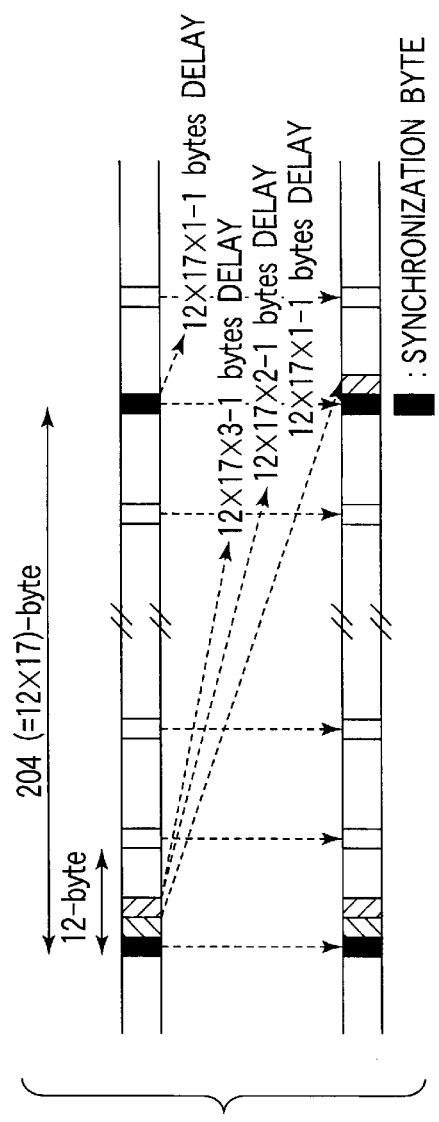

SYSTEM, TRANSMITTER AND RECEIVER FOR CODE DIVISION MULTIPLEX TRANSMISSION

CROSS-REFERENCE TO RELATED APPLICATIONS

This application is based upon and claims the benefit of priority from the prior Japanese Patent Application No. 11-337403, filed Nov. 29, 1999, the entire contents of which are incorporated herein by reference.

BACKGROUND OF THE INVENTION

The present invention relates to code division multiplex (CDM) transmission systems and receivers used in such systems, and more particularly, the invention relates to a technology for synchronization and recovery of a plurality of multiplexed transmission data streams.

As widely known, in the code division multiplex transmission technology, a plurality of transmission data streams are spread frequency modulated with a spread code unique to each data stream, and those modulated signals are transmitted after multiplexed over the same carrier frequency. In such a code division multiplex transmission technique, signals modulated only by a specific spread code known to the receiving side are transmitted after being multiplexed over the same carrier frequency as that used for other spread frequency modulated signals, so that the synchronization of the spread code on the receiving side becomes easy.

In general, transmission data streams multiplexed with a spread code are subject to error correction coding and interleaving. The values of such parameters as the coding rate for error correction and interleaving length can be changed in each transmission data stream.

The convolution code and block code are used for error correction; convolution interleaving and block interleaving are used for interleaving. If the transmitting side sets selectively a punctured code for convolution coding, block code, convolution interleaving and block interleaving, the receiving side needs to synchronize the blocks and delay depth. For this purpose, synchronization words are inserted in each transmission data stream upon transmission and the data streams are synchronized by detecting these synchronization words at receiving terminals.

BRIEF SUMMARY OF THE INVENTION

Although it is possible to change parameter values such as the coding rate for error correction and the interleaving length for each transmission data stream in the code division multiplex transmission mode, there is a problem that the receiving side has to continue a complex process of changing parameter values until it succeeds in receiving correct signals if the receiving side does not know the parameter values set for each data stream beforehand. As a result, it takes time to get correct signals on the receiving side.

Further, as described above, synchronization words should be inserted in the data stream for the synchronization of error correction codes and interleaving. Since different synchronization words are inserted in each transmission data stream, the detection of the synchronization word must be repeated each time the current transmission data stream is switched to another data stream. Then, a significant amount of time is consumed in this switching process.

Also in the code division multiplex transmission mode, the receiving terminal receives only one transmission data stream at a time, neglecting the other data streams. Therefore, if common information should be received in all the receiving terminals, all the transmission data streams have to carry the same information.

The present invention has been provided to solve above described problems. Its primary object is, therefore, to provide a system for code division multiplex transmission that allows the receiving side to receive correct data from an arbitrary transmission data stream in a short time even if the receiving side does not know the parameter values set for data reception in each transmission data stream.

The second object of the present invention is to provide a system for code division multiplex transmission that does not need to repeat the detection of synchronization words even if the current transmission data stream is switched to another when each transmission data stream is subject to error correction coding and interleaving and the insertion of synchronization words are necessary for parameter synchronization.

The third object of the present invention is to provide a system for code division multiplex transmission that allows all or specific receiving terminals to receive common information without incorporating the common information in all the transmission data streams even if the receiving terminals are receiving different transmission data streams.

The code division multiplex transmission system according to the present invention has the following characteristic configurations to solve the above problems.

(1) The system for transporting the spread frequency modulated signals of a plurality of transmission data streams by code division multiplexing, comprising:

a synchronization signal processing unit that generates spread frequency modulated signals as synchronization signals by time division multiplexing the signals for synchronizing spread code prepared for an easy synchronization of spread code on the receiving side and the information related to the structure or synchronization of each of the plurality of transmission data streams and by a spread frequency modulation using a spread code known to the receiving side; and a code division multiplexing unit that generates transmission signals by code division multiplexing the spread frequency modulated signals as synchronization signals obtained in the synchronization signal processing unit over the spread frequency modulated signals of each of the plurality of transmission data streams.

(2) The code division multiplex transmission system based on the configuration of (1), wherein, the synchronization signal processing unit comprises:

a time division multiplexing unit that time division multiplexes the signals for synchronizing spread code prepared for an easy synchronization of spread code on the receiving side and the information related to the structure or synchronization of each of the plurality of transmission data streams; and a spread frequency modulating unit that generates spread frequency modulated signals as synchronization signals by spread frequency modulating the time division multiplexed signals obtained in the time division multiplexing unit using a spread code known to the receiving side.

(3) The code division multiplex transmission system based on the configuration of (1), wherein, the synchronization signal processing unit comprises:

a first spread frequency modulating unit that spread frequency modulates the signals for synchronizing spread code prepared for an easy synchronization of spread code on the receiving side and the information related to the synchronization of each of a plurality of transmission data streams by the use of a spread code known to the receiving side;

a second spread frequency modulating unit that spread frequency modulates the information related to the structure of each of a plurality of transmission data streams by the use of a spread code known to the receiving side; and a time division multiplexing unit that time division multiplexes the spread frequency modulated signals obtained in the first and second spread frequency modulating units.

(4) The code division multiplex transmission system based on the configuration of (1), wherein, the information related to the structure of the transmission data streams includes at least the parameter information about the coding rate of the error correction code for each of the plurality of transmission data streams.

(5) The code division multiplex transmission system based on the configuration of (1), wherein, the information related to the structure of the transmission data streams includes at least the parameter information about the interleave length for each of the plurality of transmission data streams.

(6) The code division multiplex transmission system based on the configuration of (1), wherein, the information related to the synchronization of the transmission data streams includes at least synchronization words required for the synchronization of the error correction code for each of the plurality of transmission data streams.

(7) The code division multiplex transmission system based on the configuration of (1), wherein, the information related to the synchronization of the transmission data streams includes at least synchronization words required for the synchronization of the error correction code for each of the plurality of transmission data streams; and the transmission interval of the synchronization words is equal to the least common multiple of the least synchronization word transmission intervals required for the synchronization of the error correction code for each of the plurality of transmission data streams, and the timing of error correction coding of all the transmission data streams subject to code division multiplexing is matched with the synchronization words.

(8) The code division multiplex transmission system based on the configuration of (1), wherein, the information related to the synchronization of the transmission data streams includes at least synchronization words required for the synchronization of interleaving for each of the plurality of transmission data streams.

(9) The code division multiplex transmission system based on the configuration of (1), wherein, the information related to the synchronization of the transmission data streams includes at least synchronization words required for the synchronization of interleaving for each of the plurality of transmission data streams; and the transmission interval of the synchronization words is equal to the least common multiple of the least synchronization word transmission intervals required for the synchronization of interleaving for the plurality of transmission data streams, and the timing of interleaving for all the transmission data streams subject to code division multiplexing is matched with the synchronization words.

(10) The code division multiplex transmission system based on the configuration of (1), wherein, the length of the signals for synchronizing spread code is longer than the maximum difference in delay in propagation paths, which is expected from multiple path propagation conditions, and the transmission interval of the signals for synchronizing spread code is shorter than the interval of the phasing fluctuation generated on transmission paths.

(11) The code division multiplex transmission system based on the configuration of (1), wherein, with regard to the synchronization signal the number of the signals for synchronizing spread code incorporated in one unit period is an integral multiple of the depth of bit interleaving conducted on each of the plurality of transmission data streams.

(12) The code division multiplex transmission system based on the configuration of (1), wherein, with regard to the plurality of transmission data streams the bit representing that the delay of the bit interleaving is zero appears at the timing right after the appearance of the signals for synchronizing spread code.

(13) The code division multiplex transmission system based on the configuration of (1), wherein, when the plurality of transmission data streams have a TS packet structure defined by the MPEG-2 systems, with regard to the synchronization signals the number of frames fit in one super frame is selected so that an integral multiple of TS packets defined by the MPEG-2 systems fit in one super frame regardless of the coding rate of the convolution code for the plurality of transmission data streams, and the tops of the synchronization byte of each TS packet defined by the MPEG-2 systems and punctured pattern of the punctured code for the plurality of transmission data streams are set in specified positions in the first frame in one super frame of the synchronization signals.

(14) A receiving unit receiving the code division multiplexed signals transmitted by the code division multiplex transmission system based on the configuration of (1), comprising:

a decoding unit that produces the synchronization signals by decoding the received spread frequency modulated signals based on a known spread code, and a recovery processing unit that recovers the information related to the signals for synchronizing spread code, structure or synchronization of transmission data streams from the synchronization signals produced in the decoding unit.

(15) The receiving unit based on the configuration of (14), when the information related to the structure of the transmission data streams includes at least parameter information about the coding rate of the error correction code for each of the plurality of transmission data streams, including an error correction unit that extracts the parameter information about the coding rate of the error correction code for each of the plurality of transmission data streams embedded in the information related to the structure of the transmission data streams from the output from the recovering unit, and conducts the error correction of an arbitrary transmission data stream based on the parameter information.

(16) The receiving unit based on the configuration of (14), when the information related to the structure of the transmission data streams includes at least parameter information about the interleaving length for each of the plurality of transmission data streams, including a de-interleaving unit that extracts the parameter information about the interleaving length for each of the plurality of transmission data streams embedded in the information related to the structure of the transmission data streams from the output from the recovery processing unit, and conducts the de-interleaving of an arbitrary transmission data stream based on the parameter information.

(17) The receiving unit based on the configuration of (14), when the information related to the synchronization of the transmission data streams includes at least synchronization words that are necessary for synchronization of the error correction code for each of sail plurality of transmission data streams, including an error correction unit that detects the synchronization words required for synchronization of the correction code for each of the plurality of transmission data streams embedded in the information related to synchronization for the transmission data streams from the output from the decoding unit, and conducts the synchronization of the error correction code of an arbitrary transmission data stream based on the detection timing.

(18) The receiving unit based on the configuration of (14), when the information related to the synchronization of the transmission data streams includes at least synchronization words that are necessary for synchronization of interleaving for each of sail plurality of transmission data streams, including an interleaving unit that detects the synchronization words required for synchronization of interleaving for each of the plurality of transmission data streams embedded in the information related to synchronization for the transmission data streams from the output from the decoding unit, and conducts the synchronization of de-interleaving for an arbitrary transmission data stream based on the detection timing.

(19) The receiving unit based on the configuration of (14), when the information related to the synchronization for the transmission data streams includes at least synchronization words that are necessary for synchronization of the error correction code for each of sail plurality of transmission data streams, the transmission interval of the synchronization words is the least common multiple of the shortest synchronization word transmission intervals required for synchronization of the error correction code for each of the plurality of transmission data streams, and the timing for error correction coding of all the transmission data streams subject to code division multiplexing is matched with the synchronization words, including an error correction unit that produces the transmission interval of synchronization words by detecting the synchronization words required for synchronization of the correction code for each of the plurality of transmission data streams embedded in the information related to synchronization of the transmission data streams from the output from the decoding unit, and determines the timing of processing the error correction code of an arbitrary transmission data stream based on the transmission interval of the synchronization words.

(20) The receiving unit based on the configuration of (14), when the information related to the synchronization of the transmission data streams includes at least synchronization words that are necessary for synchronization of interleaving for each of the plurality of transmission data streams, the transmission interval of the synchronization words is the least common multiple of the shortest synchronization word transmission intervals required for synchronization of interleaving for each of the plurality of transmission data streams, and the timing of interleaving for all the transmission data streams subject to code division multiplexing is matched with the synchronization words, including a de-interleaving unit that produces the transmission interval for synchronization words by detecting the synchronization words required for synchronization of interleaving for each of the plurality of transmission data streams embedded in the information related to synchronization for the transmission data streams from the output from the decoding unit, and determines the timing of de-interleaving for an arbitrary transmission data stream based on the transmission interval for the synchronization words.

(21) The receiving unit based on the configuration of (14), when with regard to the synchronization signal the number of the signals for synchronizing spread code incorporated in one unit period is an integral multiple of the depth of bit interleaving conducted on each of the plurality of transmission data streams, including a bit de-interleaving unit that calculates the depth of bit de-interleaving for an arbitrary transmission data stream by counting the number of signals for synchronizing spread code included in one unit period for the synchronization signals from the output from the decoding unit and conducts bit de-interleaving of the arbitrary transmission data stream.

(22) The receiving unit based on the configuration of (14), when with regard to the plurality of transmission data streams the bit representing that the delay of each bit interleaving is zero appears at the timing right after the appearance of the signal for synchronizing the spread code, including a bit de-interleaving unit that recognizes the bit representing that the delay of bit interleaving is zero by detecting the bit located right after the signals for synchronizing spread code from the output from the decoding unit and conducts de-interleaving of an arbitrary transmission data stream.

(23) A transmission unit for use in the code division multiplex transmission system based on the configuration of (1).

(24) A code division multiplex transmission system that transports the spread frequency modulated signals of a plurality of transmission data streams by code division multiplexing, comprising:

a synchronization signal processing unit that generates spread frequency modulated signals as synchronization signals by time division multiplexing the signals for synchronizing spread code prepared for an easy synchronization of spread codes on the receiving side and information common to all or specified receiving terminals and by a spread frequency modulation using a spread code known to the receiving side; and a code division multiplexing unit that generates transmission signals by code division multiplexing the spread frequency modulated signals produced as synchronization signals in the synchronization signal processing unit onto the spread frequency modulation signals of each of the plurality of transmission data streams.

(25) The code division multiplex transmission system based on the configuration of (24), wherein, the synchronization signal processing unit comprises:

a time division multiplexing unit that time division multiplexes the signals for synchronizing spread codes prepared for an easy synchronization of spread code on the receiving side and information common to all or specified receiving terminals; and a spread frequency modulating unit that generates spread frequency modulated signals as synchronization signals by spread frequency modulating the time division multiplexed signals obtained in the time division multiplexing unit using a spread code known to the receiving side.

(26) The code division multiplex transmission system based on the configuration of (24), wherein, the synchronization signal processing unit comprises:

a first spread frequency modulating unit that spread frequency modulates the signals for synchronizing spread code prepared for an easy synchronization of spread code on the receiving side by the use of a spread code known to the receiving side, a second spread frequency modulating unit that spread frequency modulates information common to all or specified receiving terminals using a spread code known to the receiving side, and a time division multiplexing unit that generates spread frequency modulated signals as synchronization signals by the time division multiplexing of the spread frequency modulated signals produced in the first and second spread frequency modulating units.

(27) The code division multiplex transmission system based on the configuration of (24), wherein, area identification information is included in the information common to the receiving terminals so that the terminals that can receive the common information are confined to those in specified areas.

(28) The code division multiplex transmission system based on the configuration of (24), wherein, information about the group that has been registered in advance is included in the information common to the receiving terminals so that the terminals that can receive the common information are confined to those of the subscribers belonging to the group.

(29) The code division multiplex transmission system based on the configuration of (24), wherein, an activation signal that urges the activation of receiving terminals is included in the information common to the receiving terminals.

(30) The code division multiplex transmission system based on the configuration of (24), wherein, the length of the signals for synchronizing spread code is longer than the maximum difference in delay in propagation paths, which is expected from multiple path propagation conditions, and the transmission interval of the signals for synchronizing spread code is shorter than the interval of the phasing fluctuation generated on transmission paths.

(31) The code division multiplex transmission system based on the configuration of (24), wherein, with regard to the synchronization signal the number of the signal for synchronizing spread code incorporated in one unit period is an integral multiple of the depth of bit interleaving conducted on each of the plurality of transmission data streams.

(32) The code division multiplex transmission system based on the configuration of (24), wherein, with regard to the plurality of transmission data streams the bit representing that the delay of the bit interleaving is zero appears at the timing right after the appearance of the signals for synchronizing spread code.

(33) The code division multiplex transmission system based on the configuration of (24), wherein, when the plurality of transmission data streams have a TS packet structure defined by the MPEG-2 systems, with regard to the synchronization signals the number of frames fit in one super frame is selected so that an integral multiple of TS packets defined by the MPEG-2 systems fit in one super frame regardless of the coding rate of the convolution code for the plurality of transmission data streams, and the tops of the synchronization byte of each TS packet defined by the MPEG-2 systems and punctured pattern of the punctured code for the plurality of transmission data streams are set in specified positions in the first frame in one super frame of the synchronization signals.

(34) A receiving unit receiving code division multiplexed signals transmitted by the code division multiplex transmission system based on the configuration of (24), comprising:

a decoding unit that produces the synchronization signals by decoding the received spread frequency modulated signals with a known spread code, and a recovery processing unit that recovers the signals for synchronizing spread code and the information common to all or specified receiving terminals.

(35) The receiving unit based on the configuration of (34), when the information common to the receiving terminals includes area identification information and the receiving terminals that can receive the common information are confined to those in the specified areas, including a common information recovering unit that extracts the area identification information embedded in the common information of the synchronization signal from the output from the recovery processing unit, separately obtains the locational information of the receiving terminal itself, judges whether the receiving terminal is located in the specified areas based on the area identification information included in the common information of the synchronization signals, and if so, receives and recovers the common information.

(36) The receiving unit based on the configuration of (34), when the information common to the receiving terminals includes information about the group that has been registered in advance and the receiving terminals that can receive the common information are confined to those of the subscribers belonging to the group, including a common information recovering unit that extracts the group identification information included in the common information of the synchronization signal from the output from the recovery processing unit, separately obtains the group registration information of the receiving terminal itself, judges whether the group the receiving terminal belongs is included in the registered group based on the group identification information included in the common information of the synchronization signals, and if so, receives and recovers the common information.

(37) The receiving unit based on the configuration of (34), when an activation signal that urges the activation of receiving terminals is included in the information common to the receiving terminals, including a reception activating unit that detects the activation signal included in the common information of the synchronization signals from the output from the recovery processing unit and activates the reception process based on the activation signal.

(38) The receiving unit based on the configuration of (34), when with regard to the synchronization signal the number of the signals for synchronizing spread code incorporated in one unit period is an integral multiple of the depth of bit interleaving conducted on each of the plurality of transmission data streams, including a bit de-interleaving unit that calculates the depth of bit de-interleaving of an arbitrary transmission data stream by counting the number of signals for synchronizing spread code included in one unit period for the synchronization signals from the output from the decoding unit and conducts bit de-interleaving of the arbitrary transmission data stream.

(39) The receiving unit based on the configuration of (34), when with regard to the plurality of transmission data streams the bit representing that the delay of each bit interleaving is zero appears at the timing right after the appearance of the signal for synchronizing the spread code, including a bit de-interleaving unit that recognizes the bit representing that the delay of bit interleaving is zero by detecting the bit located right after the signals for synchronizing spread code from the output from the decoding unit and conducts bit de-interleaving of an arbitrary transmission data stream.

(40) A transmission unit for use in the code division multiplex transmission system based on the configuration of (24).

Namely, for attaining the above first to third goals, the code division multiplex transmission system according to the present invention, focusing attention on that all the receiving terminals receive the signal modulated only with a specific spread code (hereafter "spread code for synchronization") known to each receiving terminal in addition to transmission data streams so that the synchronization process of the spread code becomes easy to conduct at each receiving terminal. The system of the present invention spreads with the spread code for synchronization at least one kind of information out of parameters information referred to in the first goal such as the coding rate of the error correction code and interleaving length for each transmission data stream, information about synchronization words referred to in the second goal necessary for the synchronization of the error correction code and interleave of each transmission data stream and information common to all or specified receiving terminals referred to in the third goal (hereafter those kinds of information are referred to as "parameters etc."), time division multiplexes these spread frequency modulated signals of parameters etc. over signals modulated only with the spread code for synchronization, and then multiplexes these time division multiplexed signals as synchronization signals over the same frequency as that of the spread frequency modulated signals of the transmission data streams.

During the above time division multiplexing, in order not to cause problems in the synchronization process of the spread code at receiving terminals, the length of the signal for synchronizing the spread code is set longer than the maximum difference in delays in propagation paths which is expected from the multiple paths conditions, and the transmission interval of the signal for synchronizing the spread code is set shorter than the fluctuation periodicity of phasing in propagation paths.

Further, the above transmission interval of synchronization words is set to be the least common multiple of the minimum transmission intervals of synchronization words required for the synchronization of parameters such as the error correction code and interleave of each transmission data stream, and thereby the timing of the error correction coding and interleaving of all the transmission data streams subject to code division multiplexing is matched with that of synchronization words.

The above configuration allows all the receiving terminals to receive parameters etc. along with transmission data streams without causing a problem in the synchronization process of the spread code at each receiving terminal. As a result, the decoding of the error correction code and de-interleaving of each transmission data stream can be performed easily and quickly, by the use of the received information about the coding rate of the error correction code and interleave length of each transmission data stream.

In addition, since the timing for the error correction coding and interleaving of each transmission data stream matched with that of synchronization words, synchronization is not necessary to be redone for the reception of another transmission data stream and consequently the synchronization of the error correction coding and interleaving of each transmission data stream is facilitated. Also since the redo of synchronization becomes unnecessary, the time for changeover to the reception of another transmission data stream can be shortened.

Besides, information common to all or specified receiving terminals is constantly received by all or specified receiving terminals, the common information can be sent to all or specified receiving terminals without sending the same information to all the transmission data streams.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are the diagrams illustrating the format of the synchronization signal used in the code division multiplexing system according to an embodiment of the present invention;

FIG. 2 shows the format of the information carried in area D2 in the synchronization signal shown in FIG. 1A;

FIG. 3 is an example of the information carried in areas D3–D50 in the synchronization signal shown in FIG. 1A;

FIG. 4 is an example of the CDM channel information shown in FIG. 3;

FIG. 5 is an example of the additional information upon receiver activation shown in FIG. 4;

FIG. 6 is another example of information carried in areas D3–D50 in the synchronization signal shown in FIG. 1A;

FIG. 7 is an example of the structure of one super frame in the synchronization signal shown in FIG. 1;

FIG. 9 is a block diagram illustrating another structure of the CDM transmission signal generating unit according to the invention;

FIG. 10 is an example of the byte interleave of areas D3–D50 in the synchronization signal conducted in the circuit structure shown in FIG. 8 or FIG. 9;

FIG. 11 is an example of the byte interleave of areas D3–D50 in the transmission data streams conducted in the circuit structure shown in FIG. 8 or FIG. 9;

DETAILED DESCRIPTION OF THE INVENTION

Figure 8:
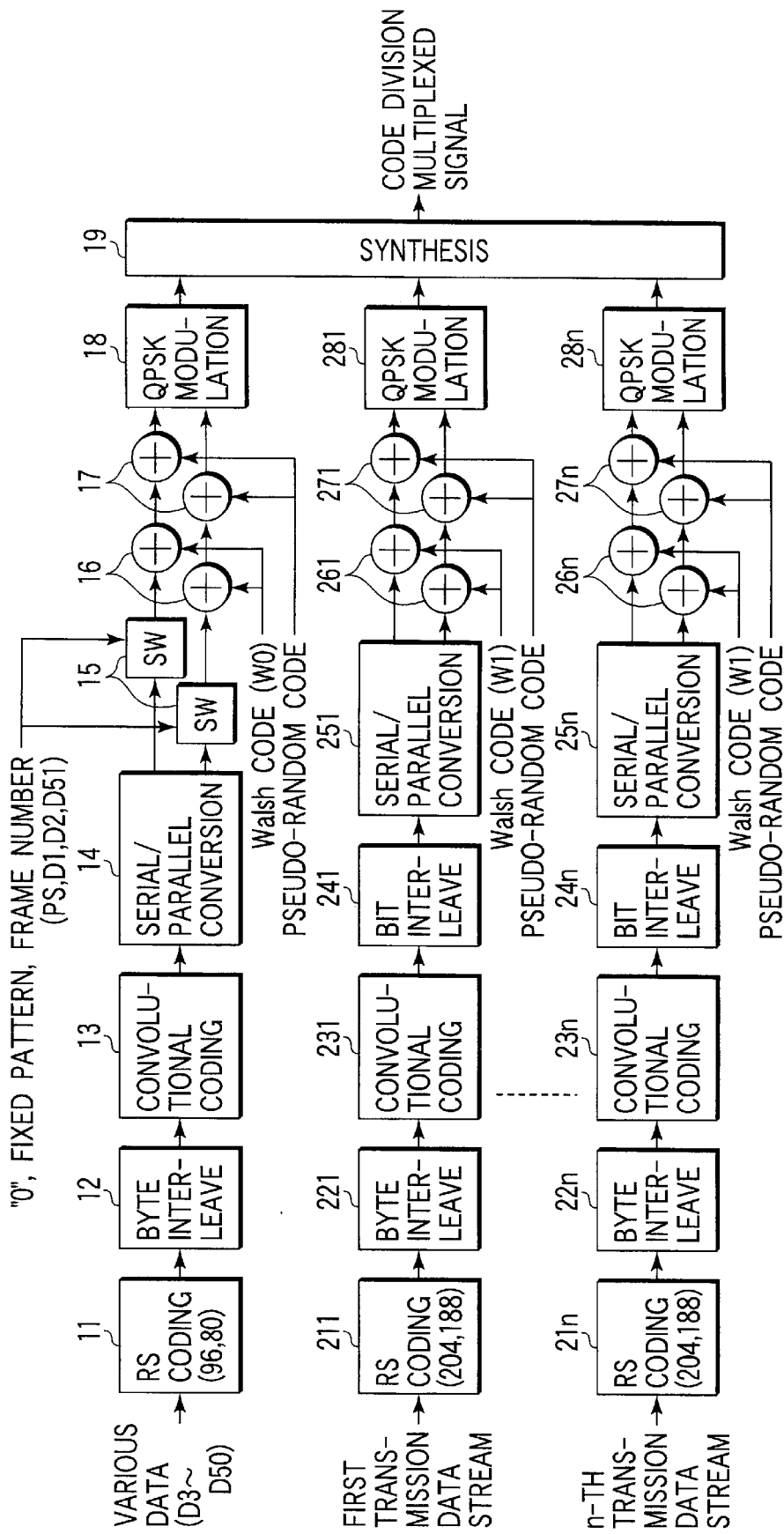
FIG. 8 is a block diagram illustrating the structure of the CDM transmission signal generating unit according to the invention.

The preferred embodiments of the present invention will be described below in detail with reference to the attached drawings.

FIGS. 1A and 1B illustrate the format of the synchronization signal used in the code division multiplexing system according to the present invention. This synchronization signal consist of pairs of a 125 μsec signal that is modulated only by the spread code for synchronization (hereafter "pilot symbol (PS)") and the other 125 μsec signal that is a spread frequency modulation signal (D) generated by spreading the data of parameters etc. using the same spread code as that used in the modulation of the pilot symbol, and these pairs of signals are subject to a time division multiplexing for every 250 μsec. In this synchronization signal, 51 pairs of the pilot symbol and the spread frequency modulation signal make one frame, and six of these frames make one super frame.

If the spread frequency modulated signals in one frame are denoted from the top as D1, D2, D3, . . . , D51, they carry the following information, for example.

D1 is a synchronization word that has a fixed pattern for frame synchronization. For example, it can be a spread frequency modulated signal generated by spreading "0110101010110101010110011001010" with the spread code for synchronization.

D2 is a synchronization word that shows the ordinal position of the current frame in the super frame. For example, it can be a spread frequency modulated signal generated by spreading a value where 4-bit binary numbers that starts at 0×0, increases by one at each frame and returns to 0×0 at the frame of 0×5 are repeated eight times as shown in FIG. 2.

D3–D50 are spread frequency modulated signals separated every 125 μsec after the data comprising, for example as shown in FIG. 3, identification information (8-bit), receiver activation signal (1-bit), CDM channel structure information (568-bit), additional information upon the receiver activation (48-bit), inspection bit (16-bit) for CRC for error checking and inspection byte (128-bit) of the Reed Solomon (RS) code, is interleaved and coded with convolution code and then spread by the spread code for synchronization to be spread frequency modulated signals.

The above identification information is information for identifying the data that follows and defined as Table 1, for example.

TABLE 1

| Value | Data contents |
| --- | --- |
| 0000000 | No assignment |
| 0000001–0011111 | Reserve |
| 0100000 | Consisting of CDM channel structure information and additional information upon receiver activation |
| 0100001–1111110 | Reserve |
| 1111111 | No assignment |

The receiver activation signal is a signal for urging the activation of the receiver in the event of an emergency; for example, it is set at "1" when the receiver should be activated, otherwise "0".

The CDM channel structure information consists of a starting CDM channel number (8-bit) and individual CDM channel structure information for ten channels (56×10-bit), as shown in FIG. 4. Each block of individual CDM channel information consists of an interleave mode (4-bit), convolution code (4-bit), TS-ID (16-bit), reserve (3-bit), minimum PID (13-bit), version number (3-bit) and maximum PID (13-bit).

The above starting CDM channel number shows to which CDM channel the starting block of individual CDM channel structure information in the current CDM channel structure information belongs. The n-th individual CDM channel information block belongs to the CDM channel of which channel number is (starting CDM channel number +n −1).

The interleave mode is the data for specifying the interleave size of the current CDM channel and takes values in Table 2, for example.

TABLE 2

| Value | Interleave Size |
| --- | --- |
| 0000 | 0 |
| 0001 | 53 |
| 0010 | 109 |
| 0011 | 218 |
| 0100 | 436 |
| 0101 | 654 |
| 0110 | 981 |
| 0111 | 1308 |
| 1000–1111 | Reserve |

The convolution mode is the data for specifying the coding rate of the convolution coding in the current CDM channel and takes values in Table 3, for example.

TABLE 3

| Value | Coding rate of convolution code |
| --- | --- |
| 0000 | Reserve |
| 0001 | Reserve |
| 0010 | Coding rate 1/2 |
| 0011 | Coding rate 2/3 |
| 0100 | Coding rate 3/4 |
| 0101 | Coding rate 5/6 |
| 0110 | Coding rate 7/8 |
| 0111–1110 | Reserve |
| 1111 | No assignment rule |

TS-ID is the data showing the number of the transport stream that the current CDM channel transmits. If there is no data for transport, TS-ID is 0xFFFF, for example.

The reserve is the area that is reserved for a future use for expansion of the CDM channel structure information. The minimum PID is the data that shows the lower limit of the PID range of the TS packets that the current CDM channel transports. If the same PID range is shared by another CDM channel, it is meant that a bunch of more than one CDM channel consists the TS.

The version number is the data that increases by one each time the setting is changed.

The maximum PID is the data showing the upper limit of the PID range of the TS packets that the current CDM channel transports. If the same PID range is shared by another CDM channel, it is meant that a bunch of more than one CDM channel consists the TS.

The above additional information upon receiver activation becomes effective as supplemental information for the receiver activation signal, comprising for example, as shown in FIG. 5, class information representing the level of emergency (4-bit), area identification information (12-bit) indicating the areas emergency news is sent to, TS-ID (16-bit) of the emergency broadcasting program and the program number (16-bit) of the emergency broadcasting program.

The CRC inspection bit is the data for data error check and serves the CRC error check in a generated polynomial, $G(x)=x^{16}+x^{12}+x^5+1$, for example.

The inspection byte of the Reed-Solomon code is the inspection byte of the shortened Reed-Solomon (96,80) code. This shortened Reed-Solomon (96,80) code is generated from the Reed-Solomon (255,239) code which consists of a code generation polynomial $g(x)=(x+\lambda^0)(x+\lambda^1)(x+\lambda^2)\ldots(x+\lambda^{15})$; $\lambda=02h$, and body generation polynomial $P(x)=X^8+x^4+x^3+x^2+1$, by adding 159-byte "00h" in front of the input data byte and removing the top 159-byte after coding.

D3–D50 can carry various sorts of extended information (616-bit), as shown in FIG. 6, in addition to the CDM channel structure information and additional information upon receiver activation.

D51 is an extra area set aside, for example, carries a signal modulated only by the spread code for synchronization.

The above information including the CDM channel structure information, additional information upon receiver activation and extended information presents a structure shown in FIG. 7, combined into each one super frame. What is labeled "✻" is the receiver activation signal.

FIG. 8 is a block diagram illustrating the configuration of a CDM transport signal generating unit that generates the synchronization signal of the above format and conducts the code division multiplexing of the first to n-th transmission data streams.

First explained with reference to FIG. 8 is the circuit configuration that conducts the generation and spread frequency modulation of the synchronization signal.

The data of parameters etc. in the first to n-th transmission data streams sent in D3–D50 is coded in a Reed-Solomon (96,80) coding circuit 11 and interleaved in a byte interleaving circuit 12. Then it is compressed and coded in a convolution coding circuit 13 and converted to parallel data in a serial/parallel conversion circuit 14 to be sent to switches (SW) 15.

The switches 15 select and output data out of the above transmission data, "0", fixed pattern and frame number sent from a separate channel for generating pilot symbol PS, D1, D2, D51. The output data is spread with the Walsh code (W0) in the first EX-OR (exclusive or) circuit 16 and then with a pseudo-random code in the second EX-OR circuit 17 to generate the synchronization signal having the above data format. This synchronization signal is QPSK-modulated in a QPSK modulation circuit 18 and supplied to a synthesizer circuit 19 as the synchronization signal subject to spread frequency modulation.

Next explained is the circuit configuration that conducts the spread frequency modulation of the first to n-th transmission data streams.

The first to n-th transmission data streams are coded in Reed-Solomon (204,188) coding circuits 211–21n and interleaved in byte interleaving circuits 221–22n and then compressed and coded in convolution coding circuits 231–23n. The data streams are further interleaved in bit interleaving circuits 241–24n and converted to parallel data in serial/parallel conversion circuit 251–25n. In the next step, they are spread with the Walsh code (W1–Wn) in first EX-OR circuits 261–26n and then with a pseudo-random code in second EX-OR circuits 271–27n. Further, they are QPSK-modulated in QPSK modulation circuits 281–28n and supplied to synthesizing circuit 19 as spread frequency modulated signals of the first to n-th transmission data streams.

The synthesizing circuit 19 generates code division multiplexed signals for transmission by multiplexing and synthesizing the spread frequency modulated signals of the synchronization signal generated in the above manner and the spread frequency modulated signals of the first to n-th transmission data streams on the same frequency.

In FIG. 8, for the generation of the synchronization signal, the information carried in the pilot symbol, D1, D2 and D51 areas and the information carried in the D3–D50 areas are time division multiplexed and then subject to spread frequency modulation with a spread code. However, it is apparent to those skilled in the art that the same synchronization signal can be generated by following another sequence such as that shown in FIG. 9 where each block of information is first spread frequency modulated with the same spread code and then subject to time division multiplexing.

In FIG. 9, the information carried in the pilot symbol, D1, D2 and D51 areas is spread with the Walsh code (W0) in a first EX-OR (exclusive or) circuit 201 and then with a pseudo-random code in a second EX-OR circuit 202, thereby generating spread frequency modulated signals. The modulated signals are BPSK-modulated in a BPSK modulating circuit 203, and then supplied to switches (SW) 15. On the other hand, the information carried in D3–D50 areas coming out of the serial/parallel conversion circuit 14 is spread with the Walsh code (W0) in the first EX-OR (exclusive or) circuit 16 and spread with a pseudo-random code in the second Ex-OR circuit 17, thereby generating spread frequency modulated signals. These modulated signals are QPSK-modulated in a QPSK modulating circuit 18, and then supplied to the switches (SW) 15.

The switches 15 select and output data out of the above transmission data, "0", fixed pattern and frame number sent from a separate channel for generating pilot symbol PS, D1, D2, D51. The output data is spread with the Walsh code (W0) in the first EX-OR (exclusive or) circuit 16 and then with a pseudo-random code in the second EX-OR circuit 17 to generate the synchronization signal having the above data format. This signal is all the same as that supplied to the synthesizer circuit 19 shown in FIG. 8.

The following is an explanation of the operation of the system of the above configuration.

In the system generating the synchronization signal and modulated signals, the switches 15 select "0" for the process from the pilot symbol to D51 to generate signals modulated only with the spread code for synchronization. During the process of D1, the switches 15 select the fixed pattern and generate the spread frequency modulation signal by spreading the fixed pattern with the spread code for synchronization. During the process of D2, the switches select the frame number and generate the spread frequency modulation signal by spreading the frame number with the spread code for synchronization. During the process of D3 to D50, the switches 15 select the serial/parallel conversion output, and the spread frequency modulation signal is generated when information such as CDM structure information coded with the Reed-Solomon code, byte-interleaved, and coded by a convolution coding with a constraint length 7 and coding rate ½ is spread with the spread code for synchronization.

The byte interleaving employed for the process of D3–D50 is, for example, a convolution interleaving with a periodicity of 12-byte as shown in FIG. 10. When the position of the top byte in the data shown in FIG. 3 or FIG. 6 is determined as a zero-th position, the interleaving is made so that the delay D for the byte in the n-th position is given by D=12×16×I (I is a residual obtained when n is divided by 12, being an integer between 0 and 11).

On the other hand, in the modulation circuit for the first to n-th transmission data streams, for example an MPEG-2

TS (transport stream) packet coded with the Reed-Solomon code (204,188), byte-interleaved, coded with a convolution code and bit-interleaved is spread with the spread code for transmission data and then QPSK-modulated to generate the spread frequency modulation signal of the transmission data streams.

For the Reed-Solomon code for the transmission data streams, a shortened Reed-Solomon code (204,188), for example, is employed. This shortened Reed-Solomon (204, 188) code is generated from the Reed-Solomon (255,239) code which consists of a code generation polynomial $g(x) = (x+\lambda^0)(x+\lambda^1)(x+\lambda^2) \ldots (x+\lambda^{15})$; $\lambda = 02h$, and body generation polynomial $P(x) = X^8 + x^4 + x^3 + x^2 + 1$, by adding 51-byte "00h" in front of the input data byte and removing the top 51-byte after coding.

For the byte interleaving of the transmission data stream, a convolution coding with a periodicity of 12-byte is employed as shown in FIG. 11, for example. When the position of the synchronized byte is determined as zero-th in a TS packet to which the Reed-Solomon code has been added, the interleaving is made so that the delay D for the byte in the n-th position is given by $D = 12 \times 17 \times I$ (I is a residual obtained when n is divided by 12, being an integer between 0 and 11).

For the convolution coding of the transmission data streams, a convolution code with a constraint length 7 and coding rate ½, and punctured codes with coding rates of ⅔, ¾ and ⅚, for example, are employed.

Figure 12A:
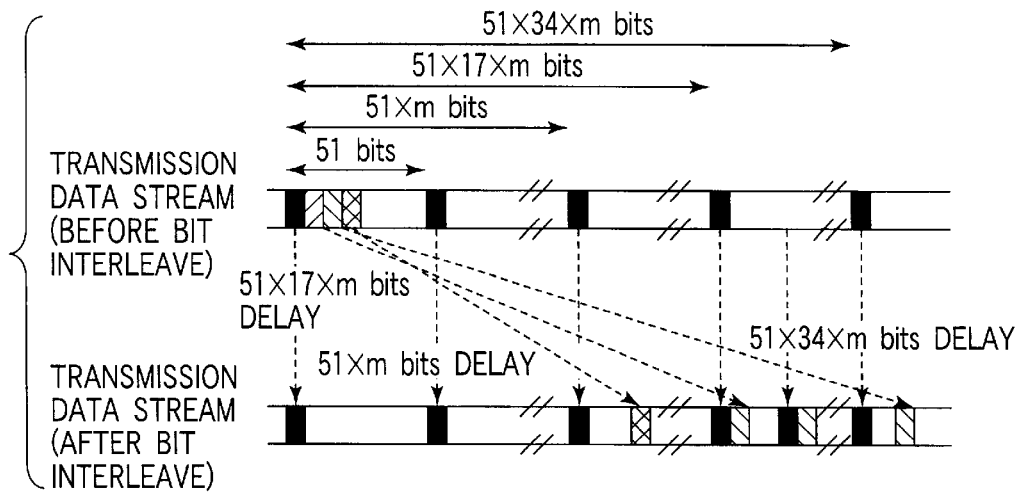
FIGS. 12A and 12B are examples of the bit interleave of transmission data streams conducted in the circuit structure shown in FIG. 8 or FIG. 9.

For the bit interleaving of the first to n-th transmission data streams, as shown in FIG. 12A, a split type convolution interleaving with a periodicity of 51-bit is employed. The delay for the bit interleaving is determined as follows. First, immediately after the synchronization signal has changed from D1 to the pilot symbol, the delay for the bit in the transmission data streams transported along with this synchronization signal coming in the Ich during the QPSK modulation is determined zero. The delay D for the bit n-bit after that is determined as $D = 51 \times (I + 17 \times J) \times m$ (I is an integer between 0 and 16, given when the residual obtained by dividing n by 51 is divided by 3, J is an integer between 0 and 2 given by the residual when n is divided by 3, and m is the interleaving size).

Figure 12B:
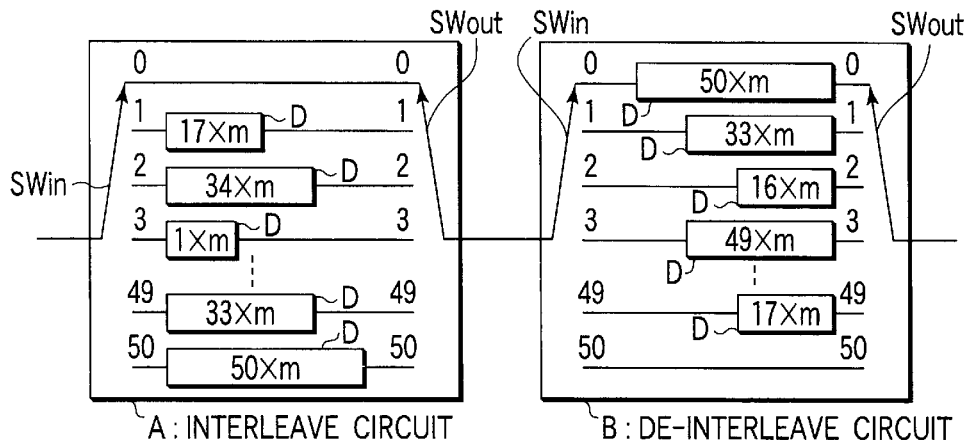

FIG. 12B is the circuit configuration for this interleaving and de-interleaving. In FIG. 12B, the interleaving circuit A and de-interleaving circuit B have input selective switch Swin and output selective switch SWout, which are interlocked to each other, and a plurality of delay devices D each inserted in one of the 51 lines which is selected by those switches. The delay in each delay device is determined so that the total delays given by both A and B circuits for the selective lines becomes equal to each other and so that the depth of bit interleaving becomes 17.

As indicated by this circuit configuration, synchronization is necessary each time the transmission data stream is switched so that the de-interleaving line selected on the receiving side agrees with the interleaving line selected on the transmitting side. For this purpose, the number of pilot symbols in one frame is determined to be 51, so that it becomes an integral multiple of 17 of the depth of bit interleaving at each transmission data stream, and the timing at which the bit of which delay time for interleaving is zero is set at the timing right after the synchronization signal D1. As a result of using D1 that is a fixed pattern (synchronization word) appearing once in one frame, the synchronization of the bit interleaving for each transmission data stream can be conducted easily and quickly.

As the spread code for the transmission data stream, a code different from the spread code for synchronization is employed; and if there is more than one transmission data stream, a unique spread code is used for each transmission data stream. For example, a code is employed as the spread code for synchronization which is generated by an exclusive OR of the W0 of the Walsh code shown in Tables 4 and 5 and a pseudo-random code generated from the pseudo-random code generating circuit shown in FIG. 13. The spread code for the n-th transmission data stream is made by an exclusive OR of the Wn of the Walsh code shown in Tables 4 and 5 and a pseudo-random code generated from the pseudo-random code generating circuit shown in FIG. 13.

Figure 13:
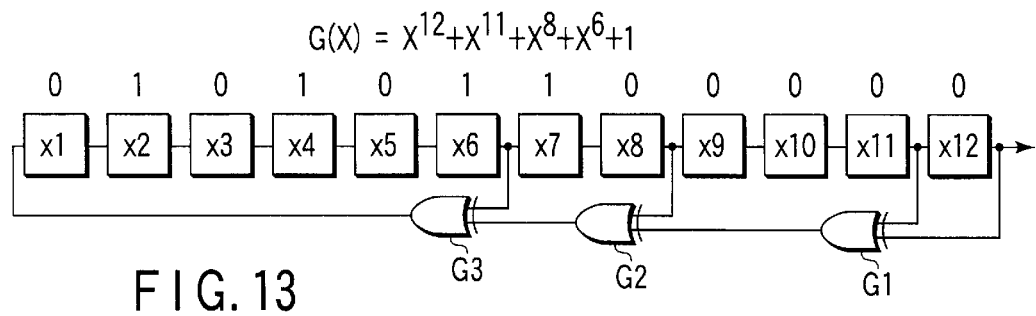
FIG. 13 is an example of pseudo-random signal generating circuit used in the circuit shown in FIG. 8 or FIG. 9.

The pseudo-random code generating circuit shown in FIG. 13 has a common configuration that has a shift register equipped with 12 delay devices X1–X12, an EX-OR circuit G1 that produces the exclusive OR of the outputs from X11 and x12, an EX-OR circuit G2 that produces the exclusive OR of the output from the EX-OR circuit G1 and x8, and an EX-OR circuit G3 that produces the exclusive OR of the output from the EX-OR circuit G2 and x6 and sends the result to the first delay device x1.

In the configuration shown in FIG. 13, the pseudo-random code is generated by setting the initial value of the shift register (x1–x12) at "010101100000" and returning the value of the shift register (x1–x12) to the initial value by resetting the delay devices x1–x12 every 2048 bits.

The above reset of the shift register (x1–x12) is conducted at the pilot symbol or the head of D1–D51 and has the same timing for the spread code for synchronization and the pseudo-random codes used for all the transmission data streams. For the Walsh codes, W0, W1, . . . , Wn, . . . , the top code in Tables 4 and 5 is output at this reset timing.

Finally, the spread frequency modulated signals of the synchronization code and the first to n-th transmission data streams are synthesized, generating code division multiplexed signals. The synthesizing must be performed so that the following two bits may be transmitted at the same time:

(1) The first bit of a pilot symbol to which the spread frequency modulated signal D2 in the synchronization signal has been changed by spreading "0x00000000" with the spread code for synchronization.

(2) One of the two bits which are contained in any of the first to nth transmission data items and which are output from convolution coding circuit when the delay device provided in the convolution coding circuit holds six most significant bits of the synchronization byte contained in a TS packet, said bit being one that will become the first bit of the puncture pattern.

The receiver that receives the code division multiplexed signals generated in the above manner has the reverse configuration of the transmitter. Its specific configuration is shown in FIG. 14.

Figure 14:
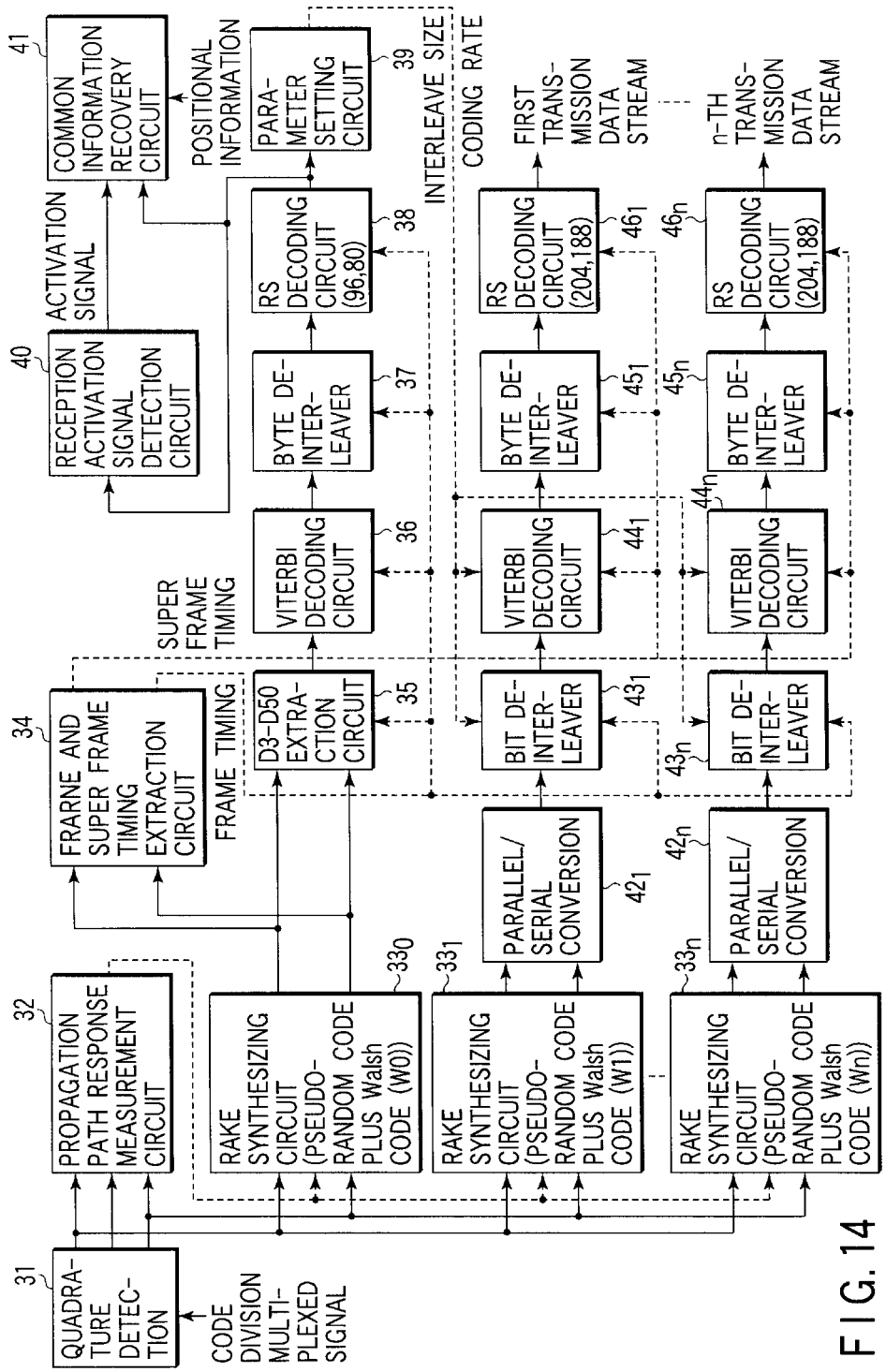
FIG. 14 is a block diagram of the structure of a CDM receiver according to the present invention.

In FIG. 14, the code division multiplexed signal entered from a transmission channel (not shown) is detected by a quadrature wave detection circuit 31 and then supplied to a transmission channel response measurement circuit 32. This transmission channel response measurement circuit, utilizing devices such as a matched filter (not shown), analyzes properties such as the transmission channel response of the input signal at the above pilot symbol to obtain the synchronization information including spread code. The information including the spread code synchronization information is sent to RAKE synthesizing circuits 330–33n.

The RAKE synthesizing circuits 330–33n separates and decodes the code division multiplexed synchronization signals of the synchronization signal and transmission data streams from the signals that have passed the quadrature wave detection circuit, utilizing information including the spread code (pseudo-random code plus Walsh code (W0–Wn)) and the synchronization information for the spread code. The synchronization signal obtained in the RAKE synthesizing circuit 330 is sent to a frame and super frame timing extraction circuit 34 the timing for frames and super frames are extracted here from the synchronization signal by the use of D1 and D2 and thereby the timing signals are generated.

The synchronization signal obtained in the RAKE synthesizing circuit 330 is sent to a D3–D50 extraction circuit 35. This D3–D50 extraction circuit 35 identifies the D3–D50 areas in the synchronization signal based on the frame timing signal and then extracts data embedded in these areas. The obtained data for D3–D50 areas are decoded by a Viterbi decoding circuit 36 and then sent to a byte de-interleaver 37. This byte de-interleaver 37 conducts byte de-interleaving on the data in D3–D50 areas that are Viterbi-decoded, in synchronization with the frame timing signal, and the output is sent to an RS decoder circuit 38. The RS decoding circuit 38 decodes the Reed-Solomon code (96,80) from the Viterbi-decoded output based on the frame timing, and the decoded output is sent to a parameter setting circuit 39, a receiver activation signal detecting circuit 40 and a common information recovery circuit 41.

The parameter setting circuit 39 extracts parameters information such as interleaving size and coding rate from the RS-decoded output. The receiver activation signal detecting circuit 40 detects the receiver activation signal from the RS-decoded output and generates the activation signal upon such detection. This activation signal is sent to the common information recovery circuit 41. This common information recovery circuit 41 intakes the RS-decoded output upon the reception of the activation signal and recovers the common information (for example, additional information upon receiver activation shown in FIG. 5) embedded in the synchronization signal, and the recovered result is sent to a display processing system. If area identification information is added to the common information, geometric information is taken from systems such as the GPS and the information recovery is conducted only when the position of the current receiver falls in the area specified by the area identification information.

On the other hand, the transmission data streams decoded in the RAKE synthesizing circuits 331–33n are converted into serial signals in the parallel/serial converters 421–42n and then sent to bit de-interleavers 431–43n. These bit-interleavers 431–43n set parameters based on information such as the interleaving size obtained in a parameter setting circuit 39 and conduct bit de-interleaving on the transmission data streams in synchronization with the frame timing signal. The output is sent to Viterbi decoding circuits 441–44n.

The Viterbi decoding circuits 441–44n set parameters and decode the bit de-interleaved output in synchronization with the super frame timing signal. The decoded output is subject to the byte interleaving and the Reed-Solomon decoding (204,188) in the byte interleavers 451–45n and the RS decoding circuits 461–46n in synchronization with the super frame timing signal. The first to n-th transmission data streams are thereby taken out.

The use of the synchronization signal described above provides the following merits.

First, a pilot symbol which is modulated only with the spread code for synchronization is inserted every 250 $\mu$sec in the above synchronization signal. Therefore, if a frequency fluctuation much smaller than 4 kHz=1/250 $\mu$sec takes place during mobile access, it does not become a problem in the synchronization process at the receiving terminal. For example, when the carrier frequency is 2.6 GHz, the frequency fluctuation of 4 kHz, which translates into a speed of about 1700 km/hour, will cause no problem during the synchronization process at realistic mobile stations.

The length of the pilot symbol, which is modulated only with the spread code for synchronization, is 125 $\mu$sec. As s result, the receiver's resolution in analyzing the signal delay time is becomes 125 $\mu$sec, which translates into 37 km in distance. This is sufficiently large, considering that the service range of the gap filler employed as a measure for insensitive areas such as inert areas behind buildings is expected to be several kilometers in radius in the case of satellite-based broadcasting systems using the code division multiplex transmission mode.

In the synchronization signal, time division multiplexed is parameter information such as the coding rate of the convolution code and interleaving size for transmission data streams which has been time division multiplexed with the same spread code as that used in the synchronization process of the spread code. Therefore, as long as the receiver receives the synchronization signal, it is possible to obtain the parameter information regardless of the reception of transmission data streams. If the parameter is set properly for each part in the receiver based on the parameter information of the transmission data streams obtained through the reception of the synchronization signal, the receiving process of the transmission data streams can be conducted easily and quickly.

On the other hand, the number of pilot symbols 51 in one frame is selected to be an integral multiple of 17 which is the depth of bit interleaving at the transmission data streams, and the bit of which delay time for interleaving is zero appears immediately after the synchronization signal D1. Therefore, the synchronization of bit interleaving for the transmission data streams can be conducted easily and quickly, using the fixed pattern D1 which appears once in one frame.

Further, since the number of frames in one super frame is six so that an integral multiple of MPEG-2 TS packets fit in one super frame, even if any coding rate for the convolution code for the transmission data streams is chosen from ½, ⅔, ¾, ⅚ and ⅞. Also in the signal format for the transmission data streams, the byte in the synchronization signal of MPEG-2-based TS packets and the head of the punctured pattern of the punctured code are determined to come right after D2 in the first frame in a super frame for synchronization signal. Therefore, the synchronization of TS packets in the transmission data streams, interleaving in synchronization with the TS packets and the punctured code can be conducted easily and quickly by counting the frame number using D2.

As described above, using D1 and D2 in the synchronization signals, instead of information in each transmission data stream, all the transmission data streams can be synchronized. As a result, further synchronization is not necessary even when the receiver receives another transmission data stream.

The synchronization signal can also carry information other than the coding rate for the convolution code and interleaving size that are essential for receiving the transmission data streams, using the areas D3–D50. Therefore, if such information as emergency information that is expected to be sent to all the receiving terminals is carried in the D3–D50 areas, it is unnecessary to include the same information in all the transmission data streams.

In this case, the area identification information is carried as well, it is also possible to selectively carry information to specified areas. Further, since TS-ID and program numbers can also be sent together, the signal reception can be automatically switched to a specific transmission data stream based on such information. In this manner, even when the information to be carried is too large to fit in the synchronization signal, the information can be automatically received at all or specific receiving terminals, if the synchronization signal which is constantly received by all the receivers includes information for switching to a specific data stream that carries the information.

In the above embodiment, the area identification information was used to specify receiving terminals that receive common information. However, it is also possible to use group identification information that has been registered in advance for specifying receiving terminals that receive common information. Then it becomes possible to provide the users of the specified receiving terminals with services such as the notification of emergency information.

In the transmission system employing the code division multiplex transmission mode according to the present invention, the synchronization process for the spread code at receiving terminals is not disturbed, even if there are significant fluctuations in amplitude and frequency during signal reception caused by the Doppler effect and phasing as is often the case with the signal reception in fast-moving mobile stations. Further, it also becomes possible for all or specified receiving terminals to receive parameters such as the coding rate and interleaving length for each transmission data stream which have been code division multiplexed, synchronization words necessary for the synchronization of the error correction code and interleaving for each transmission data stream, and common information to be sent to all or specified receiving terminals, along with the transmission data streams. In addition, the use of the received parameter and synchronization words makes it easy and speedy for receiving terminals to conduct decoding the error correction code and de-interleaving for each transmission data stream. To transmit common information to all or specified receiving terminals, the information need not be contained in all data items. Hence, the total amount of data for transmission can be reduced.

In summary, the present invention provides a code division multiplex transmission system that has the following advantages:

(1) Even if the receiving terminal does not know the parameters in the transmission data stream which are required for data reception, the correct data can be recovered from an arbitrary transmission data stream in a short time;

(2) Even if each transmission data stream is subject to error correction coding and interleaving and synchronization words are necessary for synchronization, it is unnecessary to detect again synchronization words if the current transmission data stream is switched to another data stream; and (3) Even if receiving terminals are receiving different transmission data streams, all or specified receiving terminals can receive common information without including the common information in all the transmission data streams.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for transporting the spread frequency modulated signals of a plurality of transmission data streams by code division multiplexing, comprising:

a synchronization signal processing unit for generating spread frequency modulated signals as synchronization signals by time division multiplexing the signals for synchronizing spread code prepared for an easy synchronization of spread code on the receiving side and the information related to the structure or synchronization of each of said plurality of transmission data streams and by a spread frequency modulation using a spread code known to the receiving side; and a code division multiplexing unit for generating transmission signals by code division multiplexing the spread frequency modulated signals as synchronization signals obtained in said synchronization signal processing unit over the spread frequency modulated signals of each of said plurality of transmission data streams.

2. The code division multiplex transmission system according to claim 1, wherein, said synchronization signal processing unit comprises:

a time division multiplexing unit for time division multiplexing the signals for synchronizing spread code prepared for an easy synchronization of spread code on the receiving side and the information related to the structure or synchronization of each of said plurality of transmission data streams; and a spread frequency modulating unit for generating spread frequency modulated signals as synchronization signals by spread frequency modulating the time division multiplexed signals obtained in said time division multiplexing unit using a spread code known to the receiving side.

3. The code division multiplex transmission system according to claim 1, wherein, said synchronization signal processing unit comprises:

a first spread frequency modulating unit for spreading frequency modulates the signals for synchronizing spread code prepared for an easy synchronization of spread code on the receiving side and the information related to the synchronization of each of a plurality of transmission data streams by the use of a spread code known to the receiving side;

a second spread frequency modulating unit for spreading frequency modulates the information related to the structure of each of a plurality of transmission data streams by the use of a spread code known to the receiving side; and a time division multiplexing unit for time division multiplexing the spread frequency modulated signals obtained in said first and second spread frequency modulating units.

4. The code division multiplex transmission system according to claim 1, wherein, the information related to the structure of said transmission data streams includes at least the parameter information about the coding rate of the error correction code for each of said plurality of transmission data streams.

5. The code division multiplex transmission system according to claim 1, wherein, the information related to the structure of said transmission data streams includes at least the parameter information about the interleave length for each of said plurality of transmission data streams.

6. The code division multiplex transmission system according to claim 1, wherein, the information related to the synchronization of said transmission data streams includes at least synchronization words required for the synchronization of the error correction code for each of said plurality of transmission data streams.

7. The code division multiplex transmission system according to claim 1, wherein, the information related to the synchronization of said transmission data streams includes at least synchronization words required for the synchronization of the error correction code for each of said plurality of transmission data streams; and the transmission interval of said synchronization words is equal to the least common multiple of the least synchronization word transmission intervals required for the synchronization of the error correction code for each of said plurality of transmission data streams, and the timing of error correction coding of all the transmission data streams subject to code division multiplexing is matched with said synchronization words.

8. The code division multiplex transmission system according to claim 1, wherein, the information related to the synchronization of said transmission data streams includes at least synchronization words required for the synchronization of interleaving for each of said plurality of transmission data streams.

9. The code division multiplex transmission system according to claim 1, wherein, the information related to the synchronization of said transmission data streams includes at least synchronization words required for the synchronization of interleaving for each of said plurality of transmission data streams; and the transmission interval of said synchronization words is equal to the least common multiple of the least synchronization word transmission intervals required for the synchronization of interleaving for said plurality of transmission data streams, and the timing of interleaving for all the transmission data streams subject to code division multiplexing is matched with said synchronization words.

10. The code division multiplex transmission system according to claim 1, wherein, the length of said signals for synchronizing spread code is longer than the maximum difference in delay in propagation paths, which is expected from multiple path propagation conditions, and the transmission interval of said signals for synchronizing spread code is shorter than the interval of the phasing fluctuation generated on transmission paths.

11. The code division multiplex transmission system according to claim 1, wherein, with regard to said synchronization signal the number of said signals for synchronizing spread code incorporated in one unit period is an integral multiple of the depth of bit interleaving conducted on each of said plurality of transmission data streams.

12. The code division multiplex transmission system according to claim 1, wherein, with regard to said plurality of transmission data streams the bit representing that the delay of said bit interleaving is zero appears at the timing right after the appearance of said signals for synchronizing spread code.

13. The code division multiplex transmission system according to claim 1, wherein, when said plurality of transmission data streams have a TS packet structure defined by the MPEG-2 systems, the number of frames fit in one super frame is selected with regard to said synchronization signals so that an integral multiple of TS packets defined by the MPEG-2 systems fit in one super frame regardless of the coding rate of the convolution code for said plurality of transmission data streams, and the tops of the synchronization byte of each TS packet defined by the MPEG-2 systems and punctured pattern of the punctured code for said plurality of transmission data streams are set in specified positions in the first frame in one super frame of said synchronization signals.

14. A receiving unit receiving the code division multiplexed signals transmitted by the code division multiplex transmission system according to claim 1, comprising:
   a demodulating unit for demodulating the synchronization signals by decoding the received spread frequency modulated signals based on a known spread code, and
   a recovery processing unit for recovering the information related to the signals for synchronizing spread code, structure or synchronization of transmission data streams, from the synchronization signals produced in said demodulating unit.

15. The receiving unit according to claim 14, further comprising an error correction unit that extracts from the output of said recovering unit, the parameter information about the coding rate of the error correction code for each transmission data stream embedded in the information related to the structure of said transmission data streams, and conducts the error correction of an arbitrary transmission data stream based on said parameter information, when said information related to the structure of said transmission data streams includes at least parameter information about the coding rate of the error correction code for each of said plurality of transmission data streams.

16. The receiving unit according to claim 14, further comprising a de-interleaving unit that extracts from the output of said recovery processing unit the parameter information about the interleaving length for each transmission data stream embedded in the information related to the structure of said transmission data streams, and conducts the de-interleaving of an arbitrary transmission data stream based on said parameter information, when said information related to the structure of said transmission data streams includes at least parameter information about the interleaving length for each of said plurality of transmission data streams.

17. The receiving unit according to claim 14, further comprising an error correction unit that detects from the output of said demodulating unit the synchronization words required for synchronization of the correction code for each of said plurality of transmission data streams embedded in the information related to synchronization for said transmission data streams, and conducts the synchronization of the error correction code of an arbitrary transmission data stream based on said detection timing, when said information related to the synchronization of said transmission data streams includes at least synchronization words that are necessary for synchronization of the error correction code for each transmission data streams.

18. The receiving unit according to claim 14, further comprising an interleaving unit that detects from the output of said demodulating unit the synchronization words required for synchronization of interleaving for each of said plurality of transmission data streams embedded in the information related to synchronization for said transmission data streams, and conducts the synchronization of de-interleaving for an arbitrary transmission data stream based on said detection timing, when said information related to the synchronization of said transmission data streams includes at least synchronization words that are necessary for synchronization of interleaving for each of sail plurality of transmission data streams.

19. The receiving unit according to claim 14, further comprising an error correction unit that produces the transmission interval of synchronization words by detecting from the output of said demodulating unit, the synchronization words required for synchronization of the correction code for each of said plurality of transmission data streams embedded in the information related to synchronization of said transmission data streams, and determines the timing of processing the error correction code of an arbitrary transmission data stream based on said transmission interval of the synchronization words, when said information related to the synchronization for said transmission data streams includes at least synchronization words that are necessary for synchronization of the error correction code for each of sail plurality of transmission data streams, the transmission interval of said synchronization words is the least common multiple of the shortest synchronization word transmission intervals required for synchronization of the error correction code for each of said plurality of transmission data streams, and the timing for error correction coding of all the transmission data streams subject to code division multiplexing is matched with said synchronization words.

20. The receiving unit according to claim 14, further comprising a de-interleaving unit that produces the transmission interval for synchronization words by detecting from the output of said demodulating unit, the synchronization words required for synchronization of interleaving for each of said plurality of transmission data streams embedded in the information related to synchronization for said transmission data streams and determines the timing of de-interleaving for an arbitrary transmission data stream based on said transmission interval for the synchronization words, when said information related to the synchronization of said transmission data streams includes at least synchronization words that are necessary for synchronization of interleaving for each of said plurality of transmission data streams, the transmission interval of said synchronization words is the least common multiple of the shortest synchronization word transmission intervals required for synchronization of interleaving for each of said plurality of transmission data streams, and the timing of interleaving for all the transmission data streams subject to code division multiplexing is matched with said synchronization words.

21. The receiving unit according to claim 14, further comprising a bit de-interleaving unit that calculates from the output of said demodulating unit the depth of bit de-interleaving for an arbitrary transmission data stream by counting the number of signals for synchronizing spread code included in one unit period for said synchronization signals and conducts bit de-interleaving of said arbitrary transmission data stream, when with regard to said synchronization signal the number of said signals for synchronizing spread code incorporated in one unit period is an integral multiple of the depth of bit interleaving conducted on each of said plurality of transmission data streams.

22. The receiving unit according to claim 14, further comprising a bit de-interleaving unit that recognizes the bit representing that the delay of bit interleaving is zero by detecting the bit located right after said signals for synchronizing spread code, from the output of said demodulating unit and conducts de-interleaving of an arbitrary transmission data stream, when with regard to said plurality of transmission data streams the bit representing that the delay of each bit interleaving is zero appears at the timing right after the appearance of said signal for synchronizing the spread code.

23. A transmission unit for use in the code division multiplex transmission system according to claim 1.

24. A code division multiplex transmission system that transports the spread frequency modulated signals of a plurality of transmission data streams by code division multiplexing, comprising:
  a synchronization signal processing unit for generating spread frequency modulated signals as synchronization signals by time division multiplexing the signals for synchronizing spread code prepared for an easy synchronization of spread codes on the receiving side and information common to all or specified receiving terminals and by a spread frequency modulation using a spread code known to the receiving side; and
  a code division multiplexing unit for generating transmission signals by code division multiplexing the spread frequency modulated signals produced as synchronization signals in said synchronization signal processing unit onto the spread frequency modulation signals of each of said plurality of transmission data streams.

25. The code division multiplex transmission system according to claim 24, wherein, said synchronization signal processing unit comprises:
  a time division multiplexing unit for time division multiplexing the signals for synchronizing spread codes prepared for an easy synchronization of spread code on the receiving side and information common to all or specified receiving terminals; and
  a spread frequency modulating unit for generating spread frequency modulated signals as synchronization signals by spread frequency modulating the time division multiplexed signals obtained in said time division multiplexing unit by using a spread code known to the receiving side.

26. The code division multiplex transmission system according to claim 24, wherein, said synchronization signal processing unit comprises:
  a first spread frequency modulating unit for spreading frequency modulates the signals for synchronizing spread code prepared for an easy synchronization of spread code on the receiving side by the use of a spread code known to the receiving side,
  a second spread frequency modulating unit for spreading frequency modulates information common to all or specified receiving terminals using a spread code known to the receiving side, and
  a time division multiplexing unit for generating spread frequency modulated signals as synchronization signals by the time division multiplexing of the spread frequency modulated signals produced in said first and second spread frequency modulating units.

27. The code division multiplex transmission system according to claim 24, wherein, area identification information is included in the information common to said receiving terminals so that the terminals that can receive the common information are confined to those in specified areas.

28. The code division multiplex transmission system according to claim 24, wherein, information about the group that has been registered in advance is included in the information common to said receiving terminals so that the terminals that can receive the common information are confined to those of the subscribers belonging to said group.

29. The code division multiplex transmission system according to claim 24, wherein, an activation signal that urges the activation of receiving terminals is included in the information common to said receiving terminals.

30. The code division multiplex transmission system according to claim 24, wherein, the length of said signals for synchronizing spread code is longer than the maximum difference in delay in propagation paths, which is expected from multiple path propagation conditions, and the transmission interval of said signals for synchronizing spread code is shorter than the interval of the phasing fluctuation generated on transmission paths.

31. The code division multiplex transmission system according to claim 24, wherein, with regard to said synchronization signal the number of said signal for synchronizing spread code incorporated in one unit period is an integral multiple of the depth of bit interleaving conducted on each of said plurality of transmission data streams.

32. The code division multiplex transmission system according to claim 24, wherein, with regard to said plurality of transmission data streams, the bit representing that the delay of said bit interleaving is zero appears at the timing right after the appearance of said signals for synchronizing spread code.

33. The code division multiplex transmission system according to claim 24, wherein, when said plurality of transmission data streams have a TS packet structure defined by the MPEG-2 systems, the number of frames fit in one super frame is selected with regard to said synchronization signals so that an integral multiple of TS packets defined by the MPEG-2 systems fit in one super frame regardless of the coding rate of the convolution code for said plurality of transmission data streams, and the tops of the synchronization byte of each TS packet defined by the MPEG-2 systems and punctured pattern of the punctured code for said plurality of transmission data streams are set in specified positions in the first frame in one super frame of said synchronization signals.

34. A receiving unit receiving code division multiplexed signals transmitted by the code division multiplex transmission system according to claim 24, comprising:
  a demodulating unit for producing the synchronization signals by decoding the received spread frequency modulated signals with a known spread code, and
  a recovery processing unit for recovering the signals for synchronizing spread code and the information common to all or specified receiving terminals, from the synchronization signals generated by the demodulating unit.

35. The receiving unit according to claim 34, further comprising a common information recovering unit that extracts from the output of said recovery processing unit, the area identification information embedded in the common information of said synchronization signal, separately obtains the locational information of the receiving terminal itself, determines whether the receiving terminal is located in the specified areas based on the area identification information included in the common information of said synchronization signals, and if so, receives and recovers the common information, when the information common to said receiving terminals includes area identification information and the receiving terminals that can receive the common information are confined to those in the specified areas.

36. The receiving unit according to claim 34, further comprising a common information recovering unit that extracts from the output of said recovery processing unit, the group identification information included in the common information of said synchronization signal, separately obtains the group registration information of the receiving terminal itself, determines whether the group the receiving terminal belongs is included in the registered group based on the group identification information included in the common information of said synchronization signals, and if so, receives and recovers the common information, when the information common to said receiving terminals includes information about the group that has been registered in advance and the receiving terminals that can receive the common information are confined to those of the subscribers belonging to the group.

37. The receiving unit according to claim 34, further comprising a reception activating unit that detects the activation signal included in the common information of said synchronization signals from the output of said recovery processing unit and activates the reception process based on said activation signal, when an activation signal that urges the activation of receiving terminals is included in the information common to said receiving terminals.

38. The receiving unit according to claim 34, further comprising a bit de-interleaving unit that calculates from the output of said demodulating unit the depth of bit de-interleaving of an arbitrary transmission data stream by counting the number of signals for synchronizing spread code included in one unit period for said synchronization signals and conducts bit de-interleaving of said arbitrary transmission data stream, when with regard to said synchronization signal the number of said signals for synchronizing spread code incorporated in one unit period is an integral multiple of the depth of bit interleaving conducted on each of said plurality of transmission data streams.

39. The receiving unit according to claim 34, further comprising a bit de-interleaving unit that recognizes the bit representing that the delay of bit interleaving is zero by detecting the bit located right after said signals for synchronizing spread code from the output of said demodulating unit and conducts bit de-interleaving of an arbitrary transmission data stream, when with regard to said plurality of transmission data streams the bit representing that the delay of each bit interleaving is zero appears at the timing right after the appearance of said signal for synchronizing the spread code.

40. A transmission unit for use in the code division multiplex transmission system according to claim 24.

* * * * *